United States Patent

Bhatt et al.

[11] Patent Number: 6,028,639
[45] Date of Patent: Feb. 22, 2000

[54] PROCESS AND APPARATUS FOR CONVERTING AN MPEG-2 BITSTREAM INTO SMPTE-259 COMPATIBLE BITSTREAM

[75] Inventors: Bhavesh Bhalchandra Bhatt, Franklin Park, N.J.; Ragnar Hlynur Jonsson, Reykjavik, Iceland

[73] Assignee: Thomson Consumer Electronics, Inc., Indianapolis, Ind.

[21] Appl. No.: 08/994,078

[22] Filed: Dec. 19, 1997

[51] Int. Cl.$^7$ ...................................................... H04N 7/01
[52] U.S. Cl. ........................ 348/441; 348/845; 348/416; 348/459
[58] Field of Search .................................. 348/441, 443, 348/445, 448, 451, 452, 458, 459, 424, 845, 423, 845.2, 469, 416, 413, 412, 417; H04N 7/01

[56] References Cited

U.S. PATENT DOCUMENTS 5,715,009  2/1998  Tahara et al. ........................... 348/423
5,835,151  11/1998  Sun et al. ................................ 348/441
5,852,565  12/1998  Demos .................................. 364/715.02

*Primary Examiner*—Michael H. Lee
*Attorney, Agent, or Firm*—Joseph S. Tripoli; Eric P. Herrmann; Ronald H. Kurdyla

[57] ABSTRACT

A process and apparatus for converting an MPEG-2 bitstream into an SMPTE-259 compatible bitstream is characterized by a frame rate converter which is selectively enabled to drop every 1001st frame of the incoming MPEG-2 bitstream depending on the input bitstream frame rate. If the input bitstream frame rate is other than 29.97 or 59.94 Hz, a frame dropper is enabled to discard every 1001st frame. The present converter can convert many different types of input bitstreams, such as all I types, IPIP types, or complex GOP types containing I, P, and B frames. The enabled frame dropper will drop either the I or P frame if it occurs as the 1001st frame, but if the 1001st frame is of the B frame type, the pixel information of the B frame is dropped. This produces a minimum in loss of information during the conversion. The format converter allows existing SMPTE-259 routing equipment to route and utilize MPEG-2 bitstreams, such as HDTV applications.

11 Claims, 3 Drawing Sheets

PROCESS AND APPARATUS FOR CONVERTING AN MPEG-2 BITSTREAM INTO SMPTE-259 COMPATIBLE BITSTREAM

GOVERNMENT LICENSE RIGHTS IN FEDERALLY SPONSORED RESEARCH AND DEVELOPMENT

The U.S. Government has a paid-up license in this invention and the right in limited circumstances to require the patent owner to license others on reasonable terms as provided for by the terms of contract No. 70NANB5H1174 awarded by the National Institute of Standards and Technology.

INCORPORATION BY REFERENCE

The NIST HDTV Studio System Requirements Document, rev. 3.0, of Mar. 8, 1996, in its entirety, is hereby specifically incorporated herein by reference. The MPEG-2 (Motion Pictures Experts Group) specification standards of MPEG-2 Video (ISO 13818-2) and MPEG-2 Audio (ISO 13818-1) is hereby specifically incorporated herein by reference. The Society of Motion Picture and Television Engineers (SMPTE) Standard 259 Specification entitled "10-Bit 4:2:2 Component and $4f_{sc}$ NTSC Composite Digital Signals - Serial Digital Interface" in its entirety, is hereby specifically incorporated herein by reference.

BACKGROUND OF THE INVENTION a. Field of the Invention

The present invention relates to digital signal processing and, more particularly, to the manipulation and/or conversion of MPEG-2 compressed data.

b. Description of the Prior Art

In the world of television production studios, there is a myriad of equipment necessary to eventually broadcast or transmit a television signal. The production studio has many video feeds (inputs) at its disposal for selection of the video signal to be used. Examples of video feeds are live feeds, network feeds, satellite feeds, and locally generated video content. Likewise, the production studio has many video destinations (outputs) that may be selected in routing the video signal. Examples of such video destinations are tape machines for archival purposes, production switchers for special effects, and the broadcast antenna.

The video feeds generally utilize the SMPTE (the Society of Motion Picture and Television Engineers) 259 (M) standard. This standard describes a serial digital interface for system M (525/60) digital television equipment operating with either 4:2:2 component signals or $4f_{sc}$ NTSC (National Television Standards Committee) composite digital signals. The output equipment also utilizes the standard.

In order to manage the various inputs and outputs, studios generally utilize a device known as a video router. A typical video router takes the video input streams or signals in SMPTE-259 compatible format and routes the signals to the desired destination. In order to switch from one video feed to another video feed, the video router performs the change or switch in video feed during the vertical blanking interval and, being NTSC, the frame rates of all the video through the router should be 29.97 Hz. The typical video router as described above is a rather complex and costly piece of equipment due to the electronics needed to perform the transfer or router functions.

While the SMPTE-259 standard is a digital standard, in order for studios to start producing, processing and transmitting high definition television (HDTV), it will be necessary to have MPEG-2 compatible video input and output devices such as HDTV cameras, HDTV monitors, and HDTV post production equipment to name a few. Thus, when studios start producing, processing and transmitting high definition television (HDTV) material, the SMPTE-259 router will no longer function. Replacing the SMPTE-259 router will most likely be one of the most expensive pieces of equipment.

It is thus an object of the present invention to provide a method and apparatus for converting different types of input bitstreams into an SMPTE-259 compatible bitstream, particularly for use by an SMPTE-259 router.

It is more specifically one object of the present invention to provide a method and apparatus for converting an MPEG-2 bitstream into an SMPTE-259 compliant format to allow the MPEG-2 compressed HDTV bitstream to be routable via an SMPTE-259 router.

It is another object of the present invention to provide a means whereby a television studio can route both the standard definition (e.g. NTSC) video signals and the HDTV video signals over the same video router.

It is still another object of the present invention to provide a "frame dropper" method and apparatus to minimize the loss of information between the frame rates of the input and output bitstreams for the conversion of one bitstream format into another bitstream format.

It is yet another object of the present invention to provide a word translator that converts characters that are forbidden in the SMPTE-259 standard but could exist in the bitstream as "escape characters."

SUMMARY OF THE INVENTION

In one form, the present invention is a method and an apparatus for carrying out the method, for converting an MPEG-2 type bitstream into an SMPTE-259 compatible format bitstream. The MPEG-2 bitstream is first decoded such that the DCT coefficients and the motion vectors are generated. The bitstream is re-encoded in an all I frame format and the 1001st frame is dropped only when the input bitstream frame rate is other than 29.97 or 59.94 Hz. Thereafter, the re-encoded bitstream is sent to a header encoder and SMPTE-259 encoder.

In the case where the input bitstream is an I, P, and B frame format, the pixel information is dropped when the 1001st frame encountered is determined to be a B frame, else the I or P frame is dropped. This allows the output bitstream to be SMPTE-259 compatible at a frame rate of 29.97 or 59.94 Hz.

According to one aspect of the present invention, a word translator in an SMPTE-259 encoder converts any SMPTE-259 forbidden character into a recognizable character.

BRIEF DESCRIPTION OF THE DRAWINGS

So that the manner in which the above recited features, advantages and objects of the present invention are attained and can be understood in detail, a more particular description of the invention briefly summarized above, may be had with reference to the embodiment which is illustrated in the appended drawings, wherein.

It is to be noted, however, that the appended drawings illustrate only a typical embodiment of the invention and are therefore not to be considered limiting of its scope, for the invention may admit to other equally effective embodiments.

DETAILED DESCRIPTION OF THE INVENTION

Figure 1:
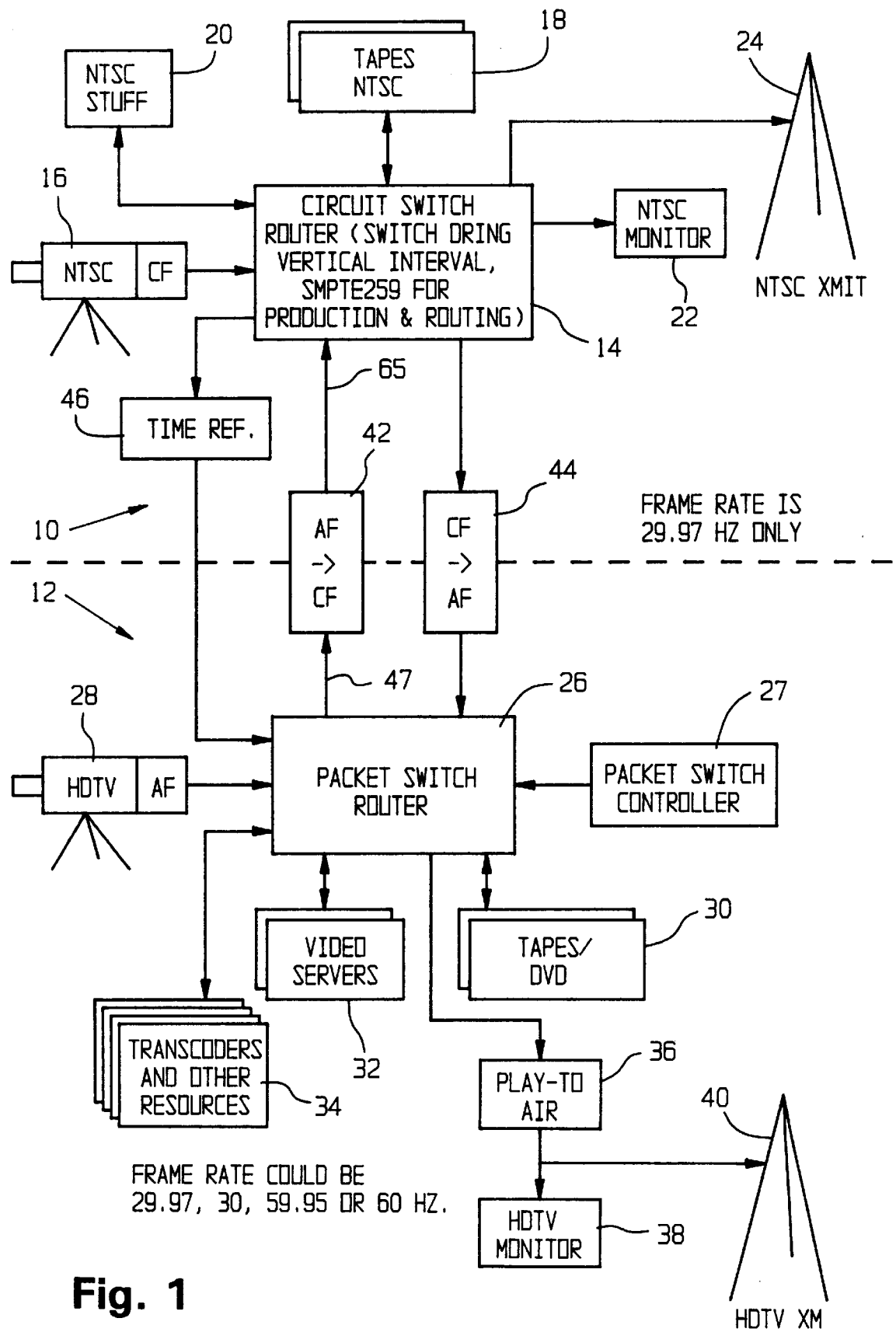
FIG. 1 is an overall block diagram of a typical broadcast studio application equipped with both analog and digital equipment, the analog equipment utilizing SMPTE-259 for production and routing, the digital equipment utilizing MPEG-1, the present transcoder providing an interface between the two systems.

Referring now to FIG. 1, there is shown a top level block diagram of the various components utilized in a typical television production or broadcast studio utilizing hybrid signal types (i.e. both HDTV and SDTV). The block diagram of FIG. 1 may be broken down into an upper half 10 and a lower half 12, shown as separated by a dashed line, with the upper half 10 corresponding to the SDTV signal type or format, and the lower half 12 corresponding to the HDTV signal type or format. The SDTV format is SMPTE-259 compatible and is designated as "CF" while the HDTV format is designated as "AF".

At the heart of the SDTV portion 10 of the studio is the SMPTE-259 router 14. The router 14 receives a bitstream in an SMPTE-259 compatible format and outputs or routes the video stream to a desired destination. Inputs to the router 14 may be from an NTSC (CF) format camera 16, an NTSC tape (VTR) 18, or other NTSC equipment 20, each in communication with the router 14. Output bitstreams may be routed to the NTSC tape 18, an NTSC monitor 22, an NTSC transmitter 24, or the other NTSC equipment 20, each in communication with the router 14. Since the router 14 is an SMPTE-259 router, the router 14 supports a frame rate of 29.97 Hertz only.

The lower portion 12 is the HDTV (AF) portion and is characterized by an MPEG-2 router 26 which functions in the same manner as the router 14, but for HDTV bitstreams. A packet switch controller 27 provides an input to router 26. The router 26 receives a bitstream from input devices such as an HDTV (AF) camera 28, tape equipment/DVD 30, video server(s) 32 and other transcoded resources/equipment 34. Output bitstreams may be routed to the tape/DVD equipment 30, the video server(s) 32, other transcoded resources/equipment 34, play to air equipment 36, an HDTV monitor 38, and an HDTV transmitter 40.

In accordance with an object of the present invention, there is provided an MPEG-2 to SMPTE-259 bitstream converter 42 that receives an MPEG-2 output bitstream from the HDTV router 26, converts the MPEG-2 bitstream into an SMPTE-259 compatible bitstream, and provides the SMPTE-259 compatible bitstream as an input to the SDTV router 14. In this manner, the SDTV router 14 will recognize and accept the input bitstream and be able to manipulate the input bitstream accordingly. In order to provide timing synchronization between the SMPTE-259 compatible bitstream from the converter 42, the MPEG-2 to SMPTE-259 converter 42 receives as an input, a timing reference 46 that is derived from the SMPTE-259 router 14. Additionally provided is an SMPTE-259 to MPEG-2 converter 44 to provide an MPEG-2 compatible bitstream to the HDTV router 26 from the SDTV router 14. The converter 44 receives the SMPTE-259 bitstream from the router 14, encodes the bitstream into MPEG-2 in a manner known in the art, and then outputs the bitstream into the router 26.

Figure 2:
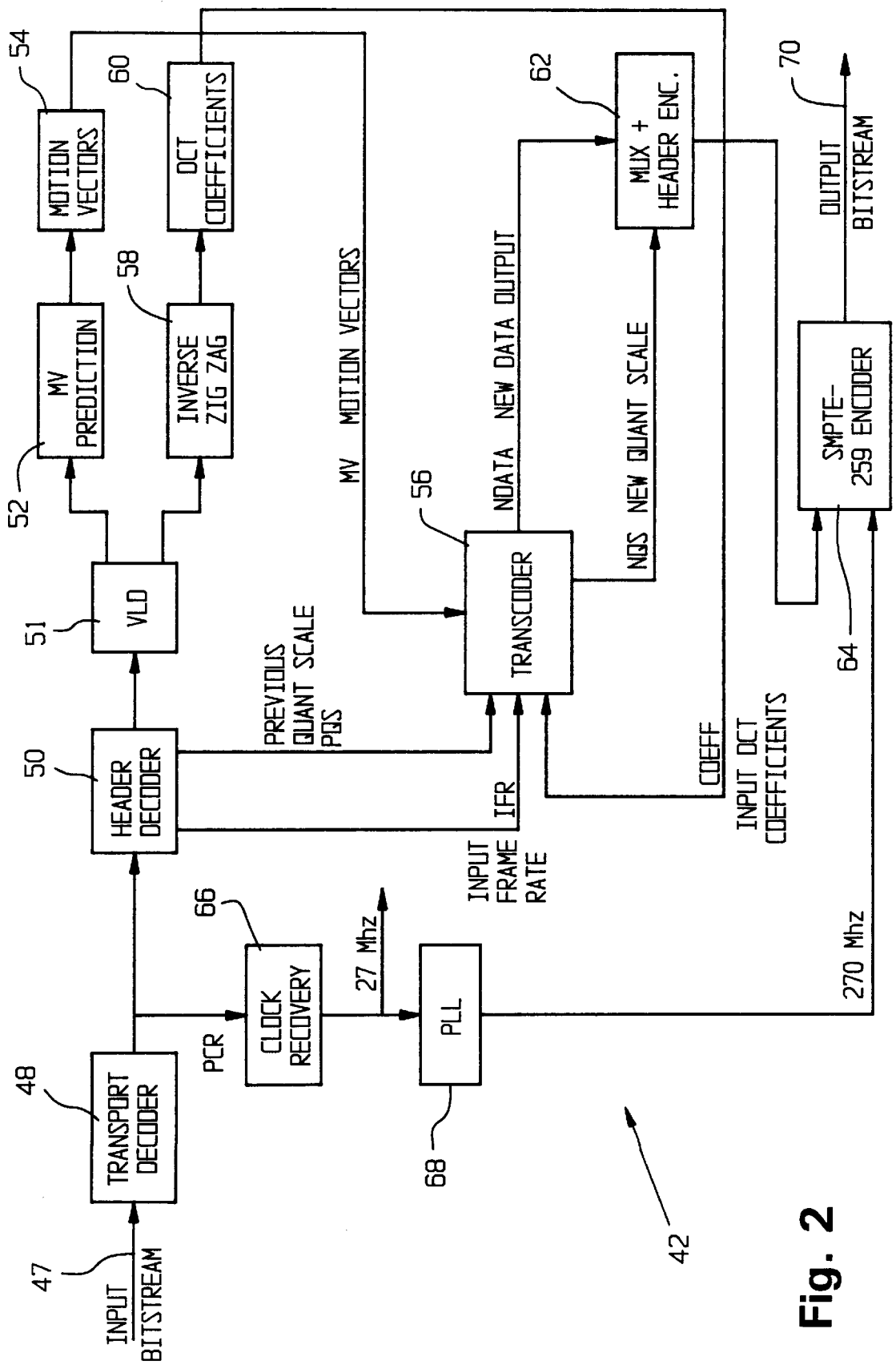
FIG. 2 is a top level block diagram of the present transcoder.

With particular reference now to FIG. 2, there is shown a top level block diagram of the present MPEG-2 to SMPTE-259 converter 42. The input bitstream from the router 26 is in MPEG-2 format and enters the converter 42 via line 47. The input bitstream first enters a transport decoder 48 where MPEG-2 data is extracted from the bitstream. The extracted MPEG-2 data is forwarded to a header decoder 50 where relevant video parameters like frame rate, and coding parameters like input quant scale, input bitrate and the like are extracted. The extracted data from the header decoder 50 is sent to the Variable Length Decoder (VLD) 50. The VLD 50 separates the encoded motion vector data from the Discrete Cosine Transform (DCT) data. The motion vectors (MV) are derived by a motion vector predictor 52 and motion vector deriver 54. The DCT data is used by the inverse zig-zag ordering block 58 to derive the DCT coefficients 60. Both the DCT coefficients from the DCT coefficients block 60 and the motion vectors from the motion vectors block 54 are inputted into a transcoder 56.

The main function of the transcoder 56 is to receive the inputted DCT coefficients and motion vectors, and generate pixel information for the generation of new data (NDATA). In addition to the motion vectors and DCT coefficients, the transcoder 56 also receives the previous quant scale (PQS) and the input frame rate (IFR) as an input from the header decoder 50. The pixels decoded by the transcoder 56 are re-encoded into an all l-frame format, denoted as NDATA, and then sent to the multiplexer and SMPTE-259 header encoder 62. After the header encoder 62, the bitstream is sent to an SMPTE-259 encoder 64 for insert the necessary code words to indicate SMPTE-259 compatible frame boundary conditions. The encoder 64 outputs the newly encoded SMPTE-259 compatible format to the SMPTE-259 router 14 via line 65 (see FIG. 1). This then allows the switching or routing of the previous MPEG-2 bitstream by the SMPTE-259 router 14. The encoder 64 also receives a clock signal from the transport decoder 48 via a clock recovery module 66 and phase lock loop block 68.

Figure 3:
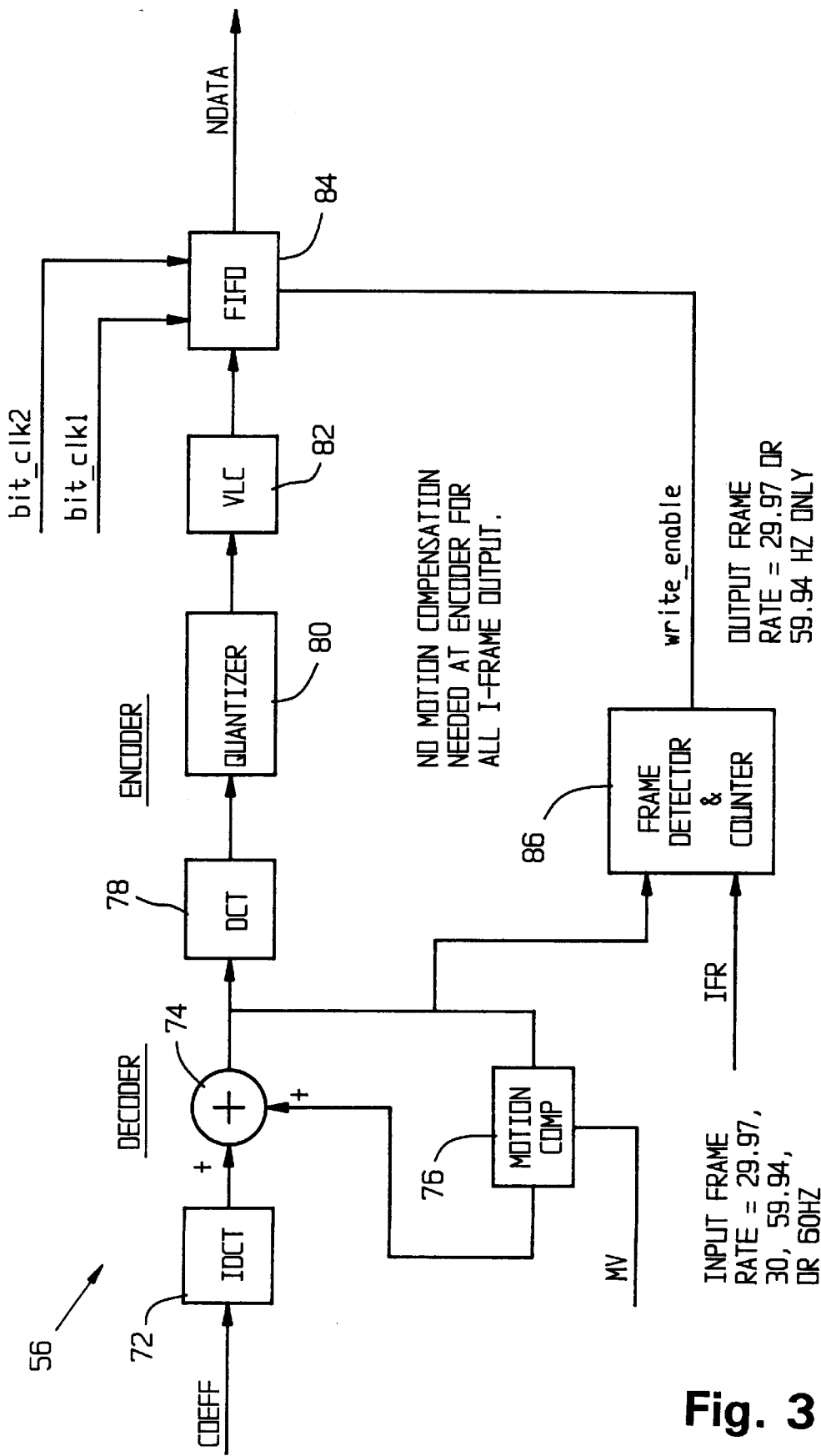
FIG. 3 is a detailed block diagram of the present transcoder.

Referring now to FIG. 3, a block diagram of the transcoder 56 is shown. Again, the main function of the transcoder 56 is to generate pixel information from the incoming MPEG-2 bitstream by decoding, and output re-encoded pixel information in an all I-frame format for encoding into an SMPTE-259 compatible format. Generally, the transcoder 56 includes a decoder section and an encoder section. The decoder section decodes the MPEG-2 encoded bitstream while the encoder section processes ("encodes") the decoded bitstream for eventual SMPTE-259 encoding as set forth above with reference to FIG. 2. The DCT coefficients are received by the IDCT (Input DCT) block 72. The motion vector (MV) is received by the motion compensation block 76 whose output is added to the IDCT by the adder block 74. The motion compensation output is also used to generate the new DCT coefficients by DCT block 78. However, no motion compensation is needed by the encoder in cases where the input is all I-frame. After the generation of the DCT coefficients, the output is quantized by the quantizer block 80 and then sent to the variable length decoding (VLD) block 82.

Since the SMPTE-259 router 14 only supports a frame rate of 29.97 Hz, and MPEG-2 can have frame rates of 29.97 Hz, 30 Hz, 59.94 Hz, or 60 Hz, the transcoder 56 has the ability to discard one in every 1001 frames when such is necessary. This is accomplished by the frame detector & counter block 86. The frame detector & counter block 86 receives the input frame rate (IFR) as determined by the header decoder 50 (see FIG. 2) and the output from the motion compensation block 76. If the input frame rate is either 30 or 60 Hz (59.94 Hz is a multiple of 29.97 Hz), the frame detector & counter 86 is enabled to drop one in every 1001 frames. Since all MPEG-2 encoders have a buffer to "smooth out" the output bit rate, this same buffer can be used to drop a frame. If the input frame rate is 29.97 or 59.94 Hz, there is no need for frame dropping, and the frame detector & counter 86 is not enabled. The resulting output frame rate from the frame detector & counter 86 is 29.97 or 59.94 Hz only and is forwarded to the first in first out (FIFO) block 84 as a write_enable signal which, along with the bit_clk1 and bit_clk2 inputs to the FIFO block 84, determines the new data (NDATA) that will be sent to the multiplexer and header encoder 62 (see FIG. 2).

The present format converter can convert many different types of input bitstreams into an SMPTE-259 compatible bitstream. Such input bitstreams may be all I frames, of IPIP type, or a complex GOP containing I, P, and B frames. If the input bitstream format is all I frames, then for the frame rate conversion, the transcoder will discard or drop every 1001st I frame. If the input bitstream is IPIP, then the transcoder will discard either the I or P frame whichever occurs every 1001st frame. However, if the input bitstream is I, P, B format, the transcoder will drop the pixel information contained in the B frame. This procedure causes the minimum loss of information during the frame rate change.

What is claimed is:

1. A method for converting an incoming MPEG-2 bitstream into an SMPTE-259 compatible bitstream, the method comprising the steps of:
   a. determining the bit rate of the incoming MPEG-2 bitstream;
   b. decoding the incoming MPEG-2 bitstream;
   c. re-encoding the decoded incoming MPEG-2 bitstream as an all I frame bitstream;
   d. selectively dropping the 1001st re-encoded I frame of the all I frame bitstream;
   e. selectively dropping the pixel information from the re-encoded 1001st I frame of the all I frame bitstream; and
   f. then encoding the resulting re-encoded and undropped I frames as an SMPTE-259 bitstream.

2. The method of claim 1, wherein the 1001st re-encoded I frame is dropped when the incoming bit rate is other than 29.97 or 59.94 Hz and the 1001st frame of the incoming MPEG-2 bitstream is an I or P frame, and wherein the pixel information of the 1001st re-encoded I frame is dropped when the incoming bit rate is other than 29.97 or 59.94 Hz and the 1001st frame of the incoming MPEG-2 bitstream is a B frame.

3. The method of claim 2, wherein the step of decoding the MPEG-2 bitstream includes determining the DCT coefficients and motion vectors of the incoming MPEG-2 bitstream, the step of re-encoding the decoded incoming MPEG-2 bitstream as all I frames includes only the calculation of the DCT coefficients, the quantization and the variable length coding of the bitstream.

4. The method of claim 1, further including the step of multiplexing the re-encoded and undropped I frames with a new quant scale prior to SMPTE-259 encoding.

5. A method of converting an incoming MPEG-2 compatible bitstream into an SMPTE-259 compatible bitstream, the method comprising the steps of:
   a. extracting MPEG-2 data from the incoming MPEG-2 compatible bitstream;
   b. extracting video parameters from the extracted MPEG-2 data;
   c. extracting coding parameters from the extracted MPEG-2 data;
   d. decoding the variable length encoded data from the extracted MPEG-2 data;
   e. generating pixel information from the variable length encoded data;
   f. encoding the generated pixel information into an all I frame format;
   g. selectively discarding one in every 1001 encoded I frame; and
   h. encoding the encoded I frames into an SMPTE-259 compatible bitstream.

6. The method of claim 5, wherein the extracted video parameters include frame rate, the extracted coding parameters include input quant scale and input bit rate, and the decoded variable length encoded data includes motion vectors and DCT coefficients.

7. The method of claim 5, wherein the extracted coding parameters includes input bit rate, and the 1001st encoded I frame is discarded when the incoming bit rate is other than 29.97 or 59.94 Hz and the 1001 st frame of the incoming MPEG-2 bitstream is an I or P frame, and wherein the pixel information of the 1001st encoded I frame is discarded when the input bit rate is other than 29.97 or 59.94 Hz and the 1001st frame of the incoming MPEG-2 bitstream is a B frame.

8. The method of claim 7, further including the step of multiplexing the encoded and discarded I frames with a new quant scale prior to SMPTE-259 compatible bitstream encoding.

9. An apparatus for converting an incoming MPEG-2 bitstream into an SMPTE-259 compatible bitstream, the apparatus comprising:
   an MPEG-2 header decoder that determines the bit rate of the incoming MPEG-2 bitstream;
   a variable length decoder in communication with the MPEG-2 header decoder that decodes the incoming MPEG-2 bitstream into a decoded bitstream;
   a transcoder in communication with the MPEG-2 header decoder and the variable length decoder, the transcoder encoding the decoded bitstream into an all I frame encoded bitstream;
   a frame dropper in communication with the header encoder, the variable length decoder, and the transcoder, the frame dropper selectively enablable to drop either every one of a specified number of the encoded I frames or the pixel information of every one of the specified number of the encoded I frames to form a resulting bitstream; and
   an SMPTE-259 encoder in communication with the transcoder that encodes the resulting bitstream into an SMPTE-259 compatible bitstream.

10. Apparatus for converting an incoming MPEG-2 bitstream into an SMPTE-259 compatible bitstream, comprising:
    an MPEG-2 header decoder that determines the bit rate of the incoming MPEG-2 bitstream;
    a variable length decoder in communication with the MPEG-2 header decoder that decodes the incoming MPEG-2 bitstream into a decoded bitstream;
    a transcoder in communication with the MPEG-2 header decoder and the variable length decoder, for encoding the decoded bitstream into an all I frame encoded bitstream;
    a selectively enabled frame dropper which is enabled when the bit rate of the incoming MPEG-2 data is not 29.97 or 59.94 Hz, and when enabled, every 1001st resulting I frame is dropped when every 1001st frame of the incoming MPEG-2 bitstream is an I or P frame, and the resulting pixel information if every 1001st resulting I frame is dropped when every 1001st frame of incoming MPEG-2 bitstream is a B frame; and an SMPTE-259 encoder in communication with the transcoder that encodes the resulting bitstream into an SMPTE-259 compatible bitstream.

11. The apparatus of claim 10, further comprising:

a multiplexer in communication with and between the transcoder and the SMPTE-259 encoder, the multiplexer multiplexing the resulting bitstream with a new quant scale.

* * * * *